United States Patent [19]

Petty-Galis et al.

[11] Patent Number: 4,946,526
[45] Date of Patent: Aug. 7, 1990

[54] METHOD FOR COMPRESSION MOLDING OF LAMINATED PANELS

[75] Inventors: Jamie L. Petty-Galis, Fort Worth; James C. Foster, Arlington, both of Tex.

[73] Assignee: LTV Aerospace and Defense Company, Dallas, Tex.

[21] Appl. No.: 114,621

[22] Filed: Oct. 29, 1987

[51] Int. Cl.⁵ .............................................. B32B 31/04
[52] U.S. Cl. .................................. 156/155; 156/196; 156/210; 156/245; 264/313; 264/317
[58] Field of Search ............... 156/155, 196, 210, 245; 264/313, 317, 344

[56] References Cited

U.S. PATENT DOCUMENTS

| | | | |
|---|---|---|---|
| 2,426,058 | 8/1947 | Scogland | 156/155 |
| 2,454,719 | 11/1948 | Scogland | 156/155 |
| 2,519,036 | 8/1950 | Ford et al. | 264/317 |
| 3,966,522 | 6/1976 | Hatch et al. | 156/155 |
| 4,026,746 | 5/1977 | Straw | 156/155 |

OTHER PUBLICATIONS

Morgan, P., Editor, Glass Reinforced Plastics, John Wiley & Sons, New York, 3rd Edition, 1961, "Stiffeners" and Sandwich Structure, pp. 197-199.
Kirk-Othmer, Encyclopedia of Chemical Technology, 3rd Edition, John Wiley & Sons, 1981, "Composites, High Performance," Supp. vol., pp. 260-281.
Kirk-Othmer, Encyclopedia of Chemical Technology, 3rd Edition, John Wiley & Sons, 1981, "Laminated and Reinforced Plastics," vol. 13, pp. 968-977.
Kirk-Othmer, Encyclopedia of Chemical Technology, 3rd Edition, John Wiley & Sons, 1982, "Silicon Compounds" (Synthetic Inorganic Silicates) and Adhesives and Binders, vol. 20, pp. 855-881.
Kirk-Othmer, Encyclopedia of Chemical Technology, 3rd Edition, John Wiley & Sons, 1979, "Molding Sands," vol. 6, pp. 212-214.
Kirk-Othmer, Encyclopedia of Chemical Technology, 3rd Edition, John Wiley & Sons, 1984, "Uses of Zirconium," vol. 24, pp. 877-878.

Primary Examiner—Caleb Weston
Attorney, Agent, or Firm—William Jackson; James M. Cate

[57] ABSTRACT

A process for producing reinforced laminate plastic panel structures by thermoplastic compression employing internal mold mandrels which are significantly embrittled during or subsequent to the compression step. Hat stiffened panels formed from two thermoplastic resin sheets may be produced by using elongated mandrels formed of ceramic particulate material adhered together by a binder such as an alkali metal silicate. The mandrels are arranged between a skin sheet and hat stiffener sheets with the respective sheets disposed between the platens of a hydraulic press or other suitable compression molding mechanism. Sandwich laminate structures can be formed employing free thermoplastic resin sheets with a first set of ceramic particulate mandrels interposed between one adjacent pair of sheets and a second set of such mandrels interposed between the other adjacent pair of sheets.

25 Claims, 4 Drawing Sheets

METHOD FOR COMPRESSION MOLDING OF LAMINATED PANELS

TECHNICAL FIELD

This invention relates to the formation of laminated plastic panel structures, and more particularly to the preparation of reinforced laminate panels by compressive thermoplastic molding utilizing disintegrative core mandrels.

ART BACKGROUND

Plastic laminate structures are used in various applications such as air frame or surface skin components of aircraft or space vehicles. Such structures typically are formed by laminating plastic composites in which reinforcing fibers are embedded in a plastic matrix material. Fibers useful in such composites include glass fibers such as E-glass or S-glass fibers, boron fibers, carbon-based fibers such as graphite fibers, and aramid fibers such as Kevlar 49. The plastic matrix material useful in the formation of such composite panels include polystryene, polyethylene, polypropylene, polysulfones, polyarylene sulfides, polyetherether ketone (PEEK) and polyetherimide (PEI). In high performance composite laminate structures graphite fibers are preferred since they impart an extremely high degree of rigidity to the panels, in particular, advanced high polymers such as PEEK, PEI, and the polyarylene sulfide are desirable as reinforced polymer matrices. These polymers, however, suffer the disadvantage of requiring relatively high temperatures before their thermoplastic melt or processing temperatures are reached.

In order to further strengthen the laminate panel structures, it is a conventional practice to incorporate stiffeners which extend from one side of the panel in an upstanding relationship. Various stiffeners which may be employed in composite panels are disclosed in "Glass Reinforced Plastics," Morgan, P., editor, John Wiley & Sons, New York, 3d ed., 1961, pp. 197-199, under the headings "Stiffeners" and "Sandwich Structure." As disclosed there, individual stiffeners may be formed separately and then bonded to the panel sheet or they may be molded in situ with the panel sheet. An alternative procedure, when employing laminates formed of two or more resin/fiber sheets, is to form a skin panel and a continuous hat stiffener separately and then bond these two components together through the use of adhesives or by induction welding of the plastic material in which the thermoplastic panels are heated locally to their thermoplastic melt points at a bonding pressure of perhaps 5-10 psi applied. Sandwich type structures of the type also described in Morgan may be employed by bonding yet another skin panel to the continuous hat stiffener section. Similarly, bonding can take place by means of adhesives or by induction welding.

DESCRIPTION OF THE INVENTION

In accordance with the present invention, there is provided a new and advantageous method for the formation of reinforced laminate panel structures by thermoplastic compression employing disintegrative internal mold mandrels. In carrying out the invention, a sheet formed of a thermoplastic resin is disposed on a first molding member having at least one female mold receptacle. A disintegrative mold mandrel is disposed adjacent to the sheet at a location opposite the mold receptacle so that the resin sheet is interposed between the mandrel and the mold receptacle. The mandrel is conformable to the mold receptacle and is formed of particulate ceramic material which is cast by means of a binder into the desired configuration. A second thermoplastic resin sheet is disposed over the mandrel such that the mandrel is then interposed between the two resin sheets. At least the first resin sheet is heated to its melt point in order to render the sheet deformable. The mandrel is compressed into the mold receptacle to shape the first sheet to the profile defined by the conforming mandrel and receptacle surfaces. Concomitantly with or subsequent to this heating and compressing step, the first and second sheets are compressed together while they are heated to their melt points. Thereafter, the sheets are allowed to cool so that they are laminated together and the portion of the first resin sheet which has been impressed into the receptacle is shaped conformably to the profiles of the mandrel and the receptacle. At the time of heating or subsequent thereto, the binder integrity is disrupted to cause the ceramic particulate material to be in an extremely brittle state. Thereafter the particulate material is withdrawn from between the first and second resin sheets. In a preferred embodiment of the invention, the ceramic material is a fine material such as quartz sand or the like having an average particle size of no more than 0.2 mm. The binder material is sodium silicate. Preferably, the sodium silicate becomes very brittle during the heating of the composite panel to produce a highly frangible mandrel. Alternatively or in addition to thermal disintegration of the mandrel, the internal mandrel may be contacted with an aqueous fluid to dissolve the sodium silicate.

In a preferred embodiment of the invention, a first molding member as described above is provided with a plurality of longitudinally extending female mold receptacles. A thermoplastic resin sheet is disposed on the molding member and a plurality of longitudinally extending mold mandrels of the particulate ceramic and binder type as described above are disposed over the sheet opposite the mold receptacles. A second thermoplastic resin sheet is placed over the mandrel so that the mandrels are interposed between the two sheets. Thereafter, a second molding member is placed over the second sheet and the two mold members are forced toward each other to compress the mandrels into the mold receptacles to shape the first sheet to the desired profiles and to compress the first and second sheets into contact with each other while they are heated at their melt points. Thereafter, the composite structure is allowed to cool to form the laminate structure and brittle mandrel material is removed as described above.

DETAILED DESCRIPTION OF THE INVENTION

Figure 1:
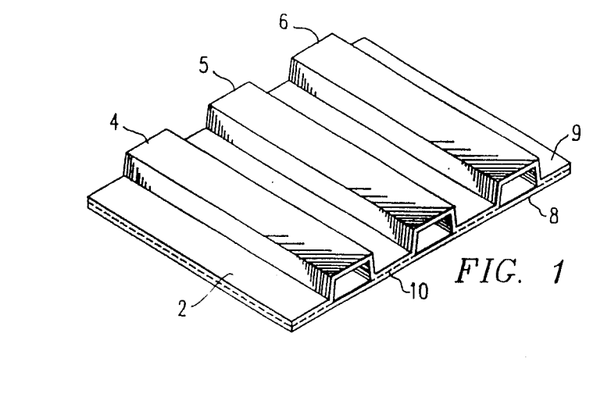
FIG. 1 is a perspective view of a hat stiffened panel structure of the type formed in accordance with the present invention.

As shown in FIG. 1 of the drawings, there is illustrated a perspective view of a hat stiffened composite structure. The structure comprises a panel portion 2 and a plurality of longitudinally extending hat stiffeners 4, 5, and 6. The laminated panel is formed of a skin sheet 8 and a continuous hat sheet 9 which is configured to provide the upstanding hat stiffeners 4, 5, and 6. In FIG. 1, the plane corresponding to the original surface of contact between the continuous hat sheet and the skin sheet 8 is indicated by broken line 10. In conventional prior art practices of forming such structures involving adhesive bonding or induction welding, a clear line of contact between the two panels would be clearly observable in the final product. In structures formed in accordance with the present invention, there is for all practical purposes no demarcation line between these two sheets. Thus in structures formed by the invention, there are no stress concentration points as would occur in panels formed in accordance with conventional procedures.

The thermoplastic resin sheets 8 and 9 used in formulating the laminated structure may be of a suitable type, as described previously. High performance composite materials are well known in the art. The most widely used composites are fiber reinforced plastics of the type described in Kirk-Othmer "Encyclopedia of Chemical Technology", 3rd Edition, Supplement Volume, pp. 260-281 under the heading "Composites, High Performance." Especially suitable preferred materials are graphite reinforced polyetherether ketones, polyetherimides and polyarylene sulfides. These materials involve the use of relatively high processing temperatures on the order of 600° F. and above. The lamination of thermoplastic sheet materials is described in Kirk-Othmer, Vol. 13, pp. 968-977 under the heading "Laminated and Reinforced Plastics." For a further description of composite materials and their use in forming high performance laminate structures, reference is made to the aforementioned Kirk-Othmer 10 articles-"Composites, High Performance," and "Laminated and Reinforced Plastics", the entire disclosures of which are incorporated herein by reference.

Figure 2:
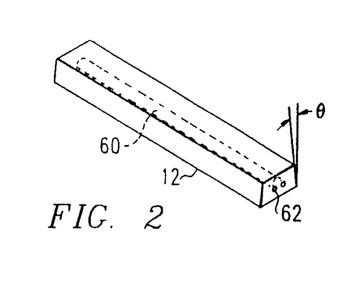
FIG. 2 is a perspective view of an elongated ceramic particulate-binder molding mandrel which may be employed in accordance with the present invention.

FIG. 2 is a perspective view of an elongated mold mandrel 12 of the type employed in the invention. The mold mandrel is formed by casting a particulate ceramic material with a binder of the type which will loose its integrity during the hot compression molding operation or upon treatment with a solvent subsequent thereto. Preferably, the binder is sufficiently compliant at the processing temperature and pressure to allow the ceramic particles to move relative to one another and function in the manner of a psuedo compressible medium. This action, together with the thermal expansion of the ceramic particles during heating, causes isostatic compression of the portion of the hat stiffener panel interposed between the mandrel and the mold receptacle during the compression process.

Preferably, the ceramic particulate material is of a fine mesh size with smooth rounded particles, i.e., spheroidal shaped particles as contrasted with irregular angular shaped particles, to enable the particles to flow passed one another during the compression step to induce a uniform distribution of pressure within the female mold cavity. In this respect it is preferred that the particulate ceramic have an average particle size of no greater than 0.2 mm and a relatively narrow particle size distribution. Preferably, the predominant particle size distribution is within the range of 0.1-0.3 mm.

A suitable particulate material is quartz sand of the type described below which is used in metal casting. However, other ceramic particulates may also be used and by the term "ceramic particulates" as used heren is meant any suitable ceramic or refractory material which will not agglomerate through sintering or melting at the processing temperatures, normally within the range of 600° F.-800° F., and pressures, normally about 200-500 psi, used in the hot compression processing step.

The preferred binder for use in the present invention is an adhesive material for the ceramic particulates which becomes extremely brittle at the processing temperature and pressure. Alternatively or preferably as a backup to thermal disintegration of the consolidated mandrel, the binder is also soluble in a solvent which does not deleteriously impact the thermoplastic resin composite materials. Suitable binders are the water soluble alkali metal silicates of the type as described in more detail in Kirk-Othmer, 3rd Edition, Vol. 20, pp. 855-881 under the heading "Silicon Compounds (Synthetic Inorganic Silicates)" and more specifically on page 876 under the heading, "Adhesives and Binders."

As noted previously, the preferred ceramic particulates are quartz molding sands, commonly referred to as foundry sands, of the type used in metal casting operations. Such molding sands are also commonly referred to as silicate sands and are composed of a find grained quartz sand possibly containing clay with sodium silicate as a binding agent. However, granular materials other than quartz or in addition to quartz may also be used as described in Kirk-Othmer, 3rd Edition, Vol. 6, pp. 212-214, under the heading "Molding Sands." For example, zirconium grains bonded with sodium silicate may also be used as described in Kirk-Othmer, Vol. 24, pp. 877-878, under the heading "Uses of Zirconium." For a further description of such molding or foundry sands, reference is made to the aforementioned Kirk-Othmer text appearing at Vol. 6, pp 212-214 and Vol. 24, pp. 877-878, the entire disclosure which is incorporated herein by reference. A suitable material used in formulating the mandrels used in the present invention is a silicate sand identified as Oklahoma grade #1, round grain silicate sand, AFS 90 mesh size.

Preferably, the elongate sides of the molding mandrels have a substantial draft angle in order to facilitate entry into the female mold receptacle as described below. More specifically, the draft angle of the mandrels preferably is at least 3° as indicated by angle $\theta$ in FIG. 2.

Figure 3:
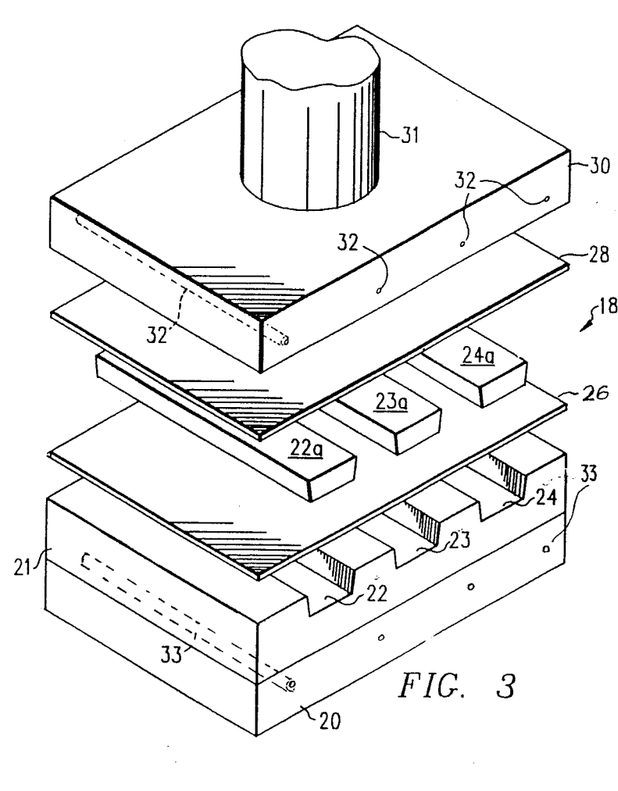
FIG. 3 is an exploded perspective view showing upper and lower molding members in a hydraulic press and thermoplastic resin sheets and molding mandrels in position to produce a hat stiffened panel section.

FIG. 3 is an exploded perspective view of mold, mandrels and thermoplastic resin sheets in place in a hydraulic compression press 18 used in forming a hat stiffened panel. As shown in FIG. 3, the lower platen 20 of the press supports a first molding member 21 having a plurality of spaced apart longitudinally extending female mold receptacles 22, 23 and 24. Mold receptacles 22-24 normally will be arranged in a generally parallel relationship, although they may deviate from this parallel configuration. A sheet 26 of thermoplastic resin which is to form the hat stiffener panel is placed on top of the lower mold member (sheet 26 is shown as spaced from the lower mold member in order to allow illustration of the mold receptacle detail) and a plurality of mold mandrels 22a, 23a, and 24a are placed over the hat stiffener sheet at locations opposite to the respective mold receptacles. The slightly tapered cross-sectional configuration of the mandrels due to the draft angle is of course oriented downward in the direction of the mold receptacles. It will be recognized that the cross-sectional configuration of the mold receptacles conforms to the cross-sectional configuration of the mold mandrels with sufficient horizontal clearance dimensions to accommodate the thickness of the resin sheet. By way of example, the hat stiffener panel may be formed of a graphite reinforced PEEK sheet having a thickness of about 1.4 mm. Consequently, the horizontal transverse dimension of the mold receptacle is 2.8 mm greater than the horizontal dimension of the mold mandrels.

A second thermoplastic resin sheet 28 which forms the skin panel is placed over the sand mandrels 22a, 23a and 24a. After assembly of the thermoplastic sheets, an upper platen member 30 is placed on the sheet 28. The upper platen is actuated by a hydraulic mechanism 31, although it will be recognized that any other suitable system for imposing a downward force upon the upper platen may employed. The upper and lower press platens are provided with heating elements 32 and 33 embedded therein. Mold member 21 also may be provided with internal heating elements. Preferably, the mold mandrels are also provided with internal resistance heating coils as described in greater detail below.

As is known to those skilled in the art, the processing temperature, that is, the temperature at which the resin sheets can be readily deformed and thermoplastically bonded should be somewhat above the initial melt temperature of the thermoplastic resin. For example, in the case of PEEK, which is a semi-crystalline polymer comprising an amorphous portion state and a crystalline state of different crystallite forms, the processing temperature typically will be about 50° F.-60° F. above the initial melting point in order to ensure that substantially all of the crystalline states of polymer are converted to the molten phase. The processing temperature varies inversely with pressure. For example, for graphite reinforced PEEK, the processing temperature at 200 psi is about 650° F. whereas at a pressure of 50 psig the processing temperature is about 750° F. Similar relationships are known for other thermoplastic resins used in the manufacture of laminated plastic structures. In carrying out the present invention, the upper and lower press platens are slowly pressed together with a force providing a relatively modest pressure, perhaps 5-10 pounds per square inch. Thereafter, the platens (and preferably also the sand mandrels) are heated in order to progressively increase the temperature of the sheets 26 and 28.

The mold temperature is monitored by means of thermocouples (not shown) embodied in the upper and lower mold structures and the heating power is regulated either manually or automatically, preferably to provide for a substantially linear increase in temperature with minimal overshoot. Once the processing temperature corresponding to the maximum pressure condition to be used in the compression mold procedure is reached (or exceeded by a limited amount), the force is increased on the upper mold to reach the compression molding pressure. The temperature preferably is also sufficient to transform the binder to a brittle constituent so that the ceramic particulates may be easily removed. Thereafter, the pressure is released and the laminated structure withdrawn from the press. The frangible internal mold mandrel material is broken up by lightly tapping the laminated structure and poured from the hat section channels under the force of gravity or by mechanically displacing the material out of the channels. If necessary, a solvent (water in the case of a sodium silicate binder) may also be circulated through the hat channels to remove the last vestiges of the mold material.

FIG. 4 illustrates the sequence of operations employed in forming a hat stiffened laminated structure by the mechanism of FIG. 3. FIG. 5 illustrates representative pressure and temperature relationships with time during the sequence of operations depicted in FIG. 4.

Figures 4A, 4B:
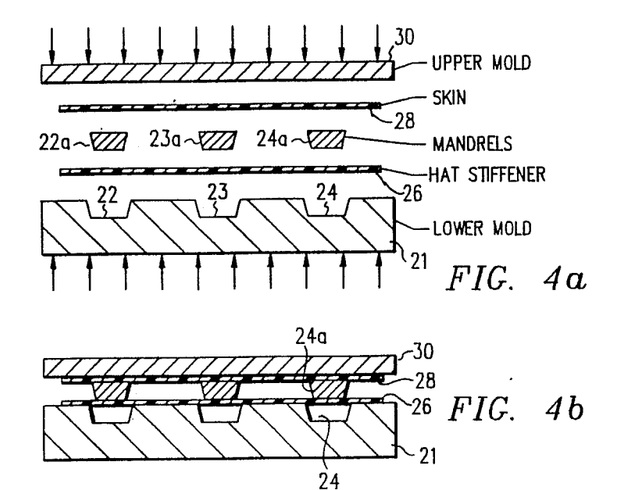
FIG. 4 is a schematic illustration showing sequential stages in the formation of a hat stiffened panel section.
Figure 4C:
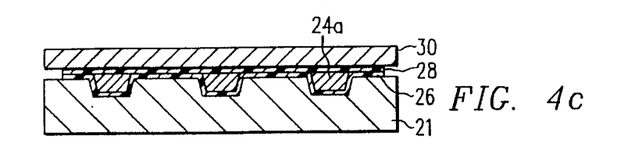

FIG. 4 presents a series of schematic end views of the compression mold members, thermoplastic sheets, and sand mandrels shown in FIG. 3. FIG. 4a is an exploded view conforming generally to FIG. 3. FIG. 4b illustrates the position of the upper and lower mold members at the start of the heating cycle where a force sufficient to provide a pressure of perhaps 5-10 psi is imposed. FIG. 4c illustrates the relationship of the mold members when the processing temperature is reached and the pressure is increased sufficiently to deform the hat stiffener panel into the mold receptacles and to bond the skin and hat stiffener panels.

Figure 4D:
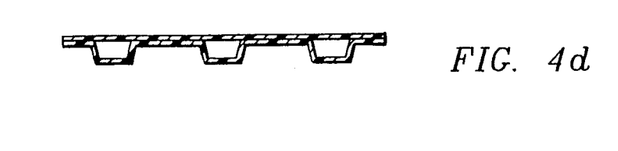
Figure 5:
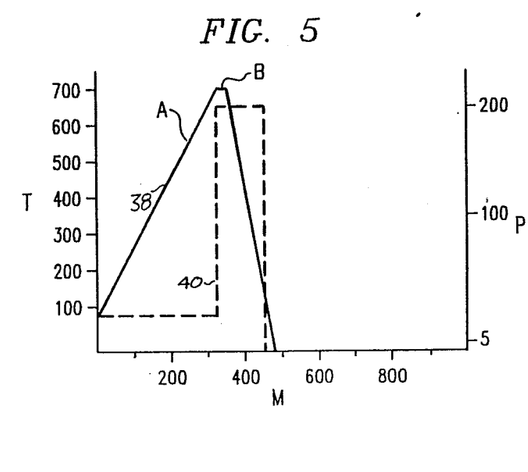
FIG. 5 is a graph illustrating relationships of pressure and temperature as a function of time involved in carrying out the invention.

FIG. 4d illustrates an end view of the finished laminated product. It will be recognized that the indication of a line of demarcation between the stiffener and skin panels is schematic only. In fact, this bonding junction which does occur in conventional prior art practices is not present in laminates formed in accordance with the present invention.

FIG. 5 is a graph illustrating representative temperature and pressure relationships occurring during the processing sequence depicted in FIG. 4. In FIG. 5, solid curve 38 is a graph of temperature, T, in degrees Fahrenheit on the ordinate versus time, M, in minutes on the abscissa. Broken line curve 40 is a plot of the pressure, P, in pounds per square inch on the ordinate versus the time. As shown in FIG. 5, during the initial time interval A, temperature is increased linearly while the pressure is maintained at a relatively low value where no deformation of the thermoplastic sheets will occur at the temperatures involved. As the temperature reaches the maximum processing temperature, the pressure is increased to cause the upper and lower mold members to be compressed together to the configuration shown in FIG. 4c. The temperature is maintained above the thermoplastic melt point (processing point) for a period of time B sufficient to ensure deformation and thermoplastic bonding of the hat stiffener and skin panels and also to cause embrittlement of the alkali metal silicate or other binder material. The maximum temperature and the time during which the temperature is maintained vary depending upon the thermoplastic materials involved and also upon the binder and the amount of binder in the sand mandrels as discussed in greater detail below. For graphite-reinforced PEEK and most other thermoplastic composite materials used in forming high performance laminate structures, the processing temperature should be maintained at a level within the range of 690° F.–710° F. for a period of at least 30 minutes before the cooling phase starts. The temperature can be maintained in the 690° F.–710° F. interval for any suitable period in excess of 30 minutes, but as a practical matter, there will be usually little incentive either in terms of bonding or binder disruption to maintain the temperature for a period in excess of 45 minutes. Maintaining the resin at the processing temperature for periods longer than perhaps two hours should normally be avoided since such prolonged heating may lead to degradation of the resin. In any case, a high pressure condition of at least 100 psi is maintained throughout a substantial period of time during the cooling cycle of the thermoplastic resin in order to ensure that the hat channels are maintained in the desired configuration under an imposed isostatic pressure due to the ceramic particles. Pressure is maintained for a suitable period of time, e.g., about 2 hours as shown in FIG. 5 until the resin is cooled below the glass transition temperature. Thereafter, it is released and the upper and lower mold members are withdrawn from one another. Relatively rapid cooling is desired, and the press platens may be provided with passages through which a cooling medium such as an air/water mixture may be circulated in indirect heat exchange with the workpiece. Such passageways for the circulation of a cooling fluid may also be incorporated into the female mold member.

As described previously, the alkali metal silicate binder becomes compliant at the high temperatures and pressures achieved during the molding process, e.g. during interval B as shown in FIG. 5. With the binder in this compliant state, the ceramic particles move relative to one another to impose an isostatic pressure internally of the laminate structure. Upon subsequent cooling, the silicate binder is highly embrittled so that the mold mandrels are highly frangible and easily disrupted.

Figure 6A:
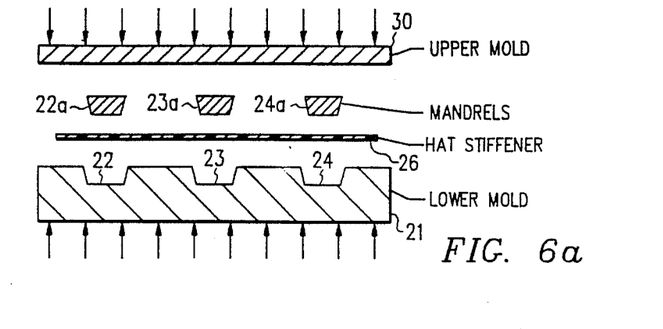
FIG. 6 is a schematic illustration of a alternative embodiment of the invention showing sequential stages in the formation of a hat stiffened panel section.
Figure 6B:
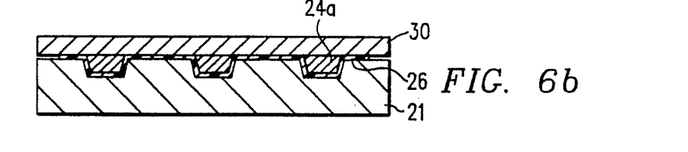
Figure 6C:
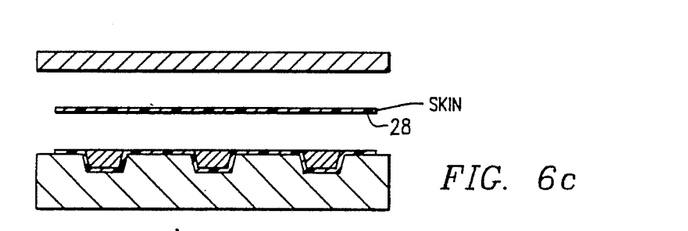
Figure 6D:
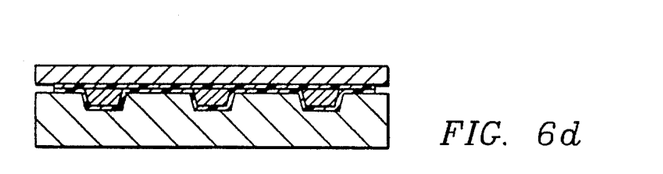
Figure 6E:
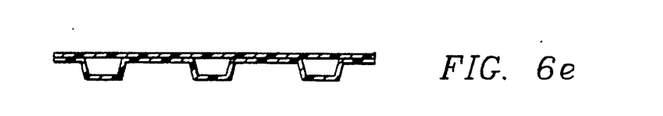

Instead of the single molding operation employed in FIG. 4, a hat stiffened laminate panel can be produced using two molding operations. This sequence of operation is illustrated in FIG. 6 which like FIG. 4 is a schematic end view of the assembly shown in FIG. 3. In the initial molding operation, only the continuous hat stiffener sheet 76, as shown in FIG. 5a, is interposed between the lower mold member and the sand mandrels. The upper mold member 30 in this case directly contacts the sand mandrels and after heating of the hat stiffener sheet to the requisite processing temperature, the pressure is increased to arrive at the configuration shown in FIG. 6b. The pressure is maintained for a suitable period of time (30 minutes in the illustrative embodiment employing PEEK reinforced resin sheets), and then is released and the skin panel 28 is placed on top of the stiffener panel as shown in FIG. 6c. The molding operation is again repeated by heating and compressing the skin and hat stiffener panels together (FIG. 6d) under suitable pressure and temperature, e.g., 200 psi and 700° F., to bond the two panels together to form the unitary laminated final structure as shown FIG. 6e.

In most cases the single molding mode of operation shown in FIG. 4, will be the procedure of choice. However, in some cases, it may be advantageous to employ the two step molding procedure of FIG. 6. For example, the two step molding process may be used in forming panels of complex curvature which are not susceptible to one step forming.

Figure 7A:
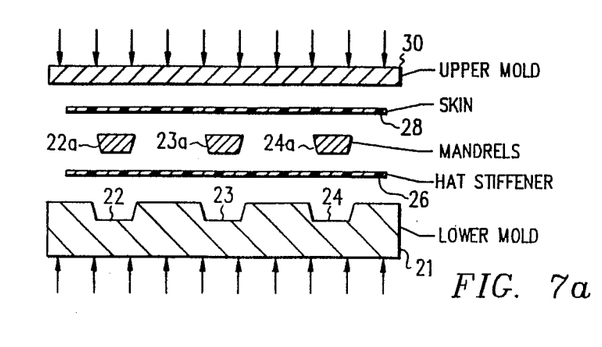
FIG. 7 is a schematic illustration showing sequential stages of operation in another embodiment of the invention employed in forming a sandwiched stiffened composite structure.
Figure 7B:
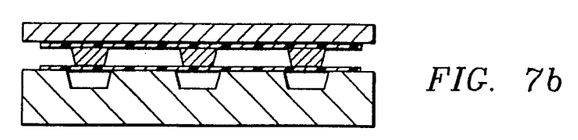
Figure 7C:
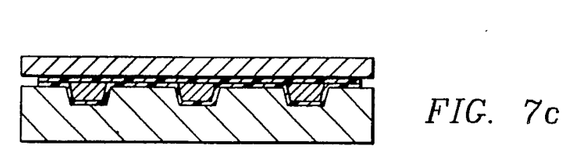
Figure 7D:
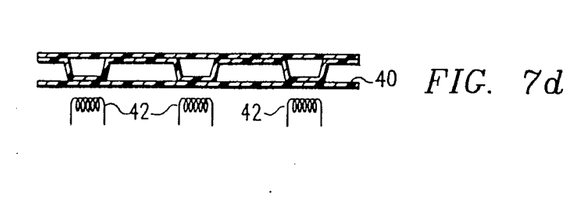

A composite molding operation of the type depicted in FIG. 4 can be followed by an induction welding procedure to produce a sandwich panel structure in which a hat stiffener panel is bonded on both sides to skin panels. This sequence of operation is illustrated in FIG. 7. As shown in FIGS. 7a, 7b, and 7c, the procedure described previously, with respect to FIG. 4, can be employed in order to arrive at a two-panel laminate as shown in FIG. 7c. Thereafter, a second skin panel 40 can be positioned adjacent the continuous hat stiffener sheet as shown in FIG. 7d and bonded thereto by an induction welding procedure. The induction welding procedure involves heating the bottom skin panel locally as indicated by induction coil heaters 42 to a bonding temperature while under a pressure of only a few pounds per square inch. For example, in the case of graphite fiber reinforced PEEK sheets, the induction welding procedure can be carried out at a temperature of about 700°–720° F. and an imposed pressure of 10 pounds per square inch. This will bond the lower skin panel to the remainder of the assembly. This procedure will not achieve the monolithic structure described previously and thus there will be a stress concentration at the bonding interface between the hat stiffeners and the lower skin sheet due to electromagnetic susceptors and resin film at the interface required by the induction welding process.

Figures 8A, 8B:
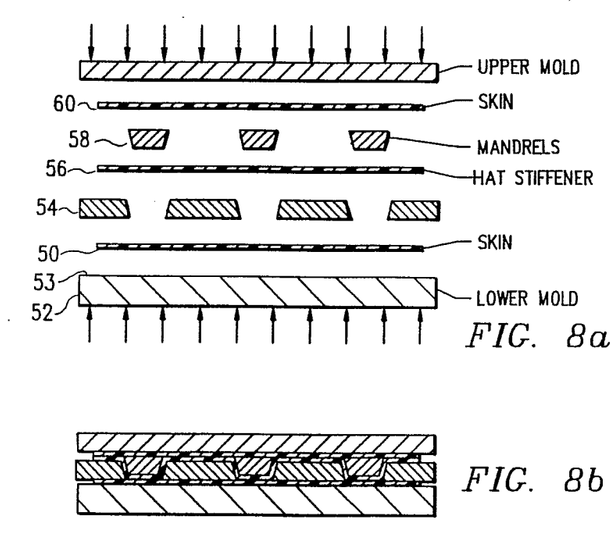
FIG. 8 is a schematic illustration showing sequential stages of operation in an alternative mode of the invention used in forming a sandwiched stiffened panel structures.
Figure 8C:
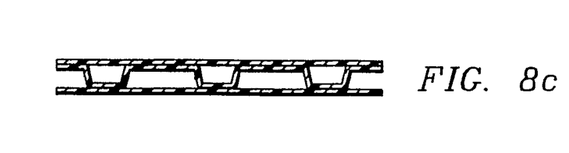

In a further embodiment of the invention, a monolithic sandwich structure can be achieved in one compression molding operation through the use of two sets of cast ceramic mandrels of the type described previously. This embodiment of the invention is illustrated schematically in FIG. 8 which shows a sequence of operations similarly as with respect to FIGS. 4, 6, and 7. As shown in FIG. 8, a lower outer skin sheet 50 of fiber reinforced thermoplastic resin is disposed on a lower molding member 52, which in this case has a planar surface 53. A set of longitudinally extending mold mandrels 54 of the type described previously are disposed on the lower skin sheet in spaced apart positions as illustrated in FIG. 8a. An intermediate continuous hat stiffener panel 56 is disposed on top of the first set of mandrels and a second set of longitudinally extending mandrels 58 placed oppposite the spaced intervals between the first set of mandrels. By analogizing the arrangement in FIG. 8 to that of FIG. 4, it will be recognized that mandrels 54 will have dimensions corresponding to the mold sections between or adjacent the receptacles 22–24 of FIG. 4 and the intervals between mandrels 54 correspond to the female mold receptacles of the lower mold member shown in FIG. 4. The mandrels 58, of course, have a cross-sectional dimensional configuration corresponding to the intervals between mandrels 54. Finally, a second outer skin sheet 60 of thermoplastic resin is disposed over the mandrels 58 and the procedure described previously is employed. That is, the upper and lower molds are compressed together with a force of perhaps 10 pounds per square inch during the initial linear heating interval. When the processing temperature is reached, the pressure is elevated, e.g., to 200 psi in the example given previously, and maintained for the desired time to force the two sets of mandrels into the configuration shown in FIG. 8b. The assembly is then cooled as described previously and the embrittled particulates from the first and second set of mandrels are removed to leave the laminated configuration shown in FIG. 8c. Again, this structure provides a monolithic laminate structure with no distinguishable bonding junctures between the three sheets of thermoplastic material.

The cast ceramic mandrels can, as noted previously, be formulated of silicate sand of the type used in foundry operations with an alkali metal silicate, usually sodium silicate as a consolidating binder. In using such sand, the binder concentration will normally be significantly higher than the amount, typically 1-2 wt. %, used in foundry applications. In the present invention, the binder concentration preferably is at least 5 wt. %. A formulation of 5% sodium silicate binder and 95% sand having an average particle size of 0.2 mm produces a mandrel having a compressive strength of about 800 psi, which is well above the maximum, usually about 500 psi at 700° F., which will be employed in the thermoplastic compression molding procedure. The compressive strength can be increased by adding more binder. For example, 10% binder will provide a compressive strength of about 1700 psi. However, when the binder concentration is increased, it becomes more difficult to achieve disintegration of the internal mandrels during the compression molding procedure. This dictates the provision of a longer time interval at the maximum processing temperature (interval B as shown in FIG. 5) since binder embrittlement which allows mandrel disintegration is a function of time, temperature and the binder concentration. Ultimately, this may make removal of the mandrel material more difficult and require washing with an aqueous solvent as described previously to remove the sand material from the hat channels. In addition, the isostatic compression phenomenon allowing the ceramic particles to redistribute themselves as described previously is less pronounced. Thus, it is preferred to maintain the binder concentration within the range of 5-10 wt. %.

The mandrels are formed in suitable molds corresponding in cross section to the dimensions on the mold receptacles reduced by an amount sufficient to accommodate the continuous hat stiffener laminate and then consolidated by any suitable technique. For example, silicate sand used in foundry operations can be cast into the desired configuration and carbon dioxide then sprayed on the mandrels as in the $CO_2$ process referred to, for example, in Kirk-Othmer, Vol. 20, p. 876. After removal of the mandrels from the molds they are again sprayed on all surfaces with carbon dioxide to complete the hardening process.

The mandrels, while relatively high in compressive strength, have a low tensile strength and thus for mandrels having a length of more than a few feet, it is desirable to incorporate suitable reinforcement internally in the mandrels. For example, a coarse wire mesh similar to a configuration used in reinforcing concrete may be employed. Also, where reinforcing materials are employed, it may be desirable to use a conductive metal shaped in the configuration of a resistance heating element so that the mandrel can be heated internally. Thus, referring back to FIG. 2, a coiled heating element 60, shown in a broken line, extends internally throughout the length of the mandrel 12. Heating element 60 is connected at one end of the mandrel to terminals 62 for connection to a power circuit. Heating elements located internally in the mandrels may be employed in any of the embodiments described above, but they are particularly useful in the embodiment of FIG. 8 where the initial air spaces between the first and second sets of mandrels may render uniform heating of the hat stiffener section difficult if only conduction heating from the upper and lower mold members is relied upon.

Having described specific embodiments of the present invention, it will be understood that modification thereof may be suggested to those skilled in the art, and it is intended to cover all such modifications as fall within the scope of the appended claims.

What is claimed:

1. In a method for the formation of a reinforced laminate panel structure, the steps comprising:
    (a) disposing a first sheet formed of a thermoplastic resin on a first molding member having a female mold receptacle;
    (b) disposing a mold mandrel conformable to said mold receptacle and formed of particulate ceramic material and a binder functioning as an adhesive between the said ceramic material at a location opposite said mold receptacle whereby said thermoplastic resin sheet is interposed between said mold receptacle and said mandrel;
    (c) disposing a second thermoplastic resin sheet over said mandrel whereby said mandrel is interposed between said first and second sheets;
    (d) subsequent to step (b) heating at least said first thermoplastic resin sheet to the melt point of said sheet to render said sheet deformable and compressing said mandrel into said mold receptacle to shape said first sheet to the conforming profiles of said mandrel and said receptacle;
    (e) subsequent to or concomitant with step (d), heating said second thermoplastic resin sheet to the melt point thereof;
    (f) subsequent to step (c) and subsequent to or concomitant with step (e) compressing said first and second sheets together while said first and second sheets are heated to the melt points thereof and thereafter allowing said sheets to cool so that such sheets are laminated together and the portion of said first sheet in said receptacle is shaped conformably to the profiles of said mandrel and said receptacle; and
    (g) concomitant with or subsequent to the heating of step (f) disrupting the binder integrity in said mold to cause said ceramic particulate material to be in a frangible condition and withdrawing said particulate material from between said first and second sheets.

2. The method of claim 1 wherein the integrity of said binder material is disrupted by heating to a temperature sufficient during step (f) to cause said binder material to disintegrate.

3. The method of claim 1 wherein said binder material is disrupted in step (g) by contacting said mandrel in situ within said receptacle with a solvent for said binder material.

4. The method of claim 3 wherein said binder material is water soluble and said solvent is water.

5. The method of claim 4 wherein said binder material is sodium silicate.

6. The method of claim 1 wherein said ceramic material has an average particle size of no greater than 0.2 mm.

7. The method of claim 6 wherein said ceramic particulate material has a predominant particle size distribution within the range of 0.1–0.3 mm.

8. The method of claim 1 wherein said second thermoplastic sheet is disposed over said mandrel subsequent to step (d) and compressed against first said sheet and heated subsequent to the shaping of said first sheet between said mandrel and said mold receptacle.

9. The method of claim 1 wherein step (d) is carried out subsequent to step (c) with said mandrel interposed between said first and second sheets whereby the heating of said first and second sheets and the compression of said first sheet into said receptacle and said second sheet against said first sheet to cause lamination of said sheets occurs in a single operation.

10. The method of claim 1 wherein said mold mandrel is of an elongated configuration and is placed longitudinally between said sheets.

11. The method of claim 10 further comprising the step utilizing a plurality of said elongated mandrels and said conforming mold receptacles.

12. In a method for the formation of a reinforced laminate panel structure, the steps comprising:
(a) disposing a first sheet formed of a thermoplastic resin on a first molding member having a plurality of longitudinally extending female mold receptacles;
(b) disposing a plurality of longitudinally extending mold mandrels conformable to said mold receptacles and formed of particulate ceramic material and a binder functioning as an adhesive between said ceramic material at locations opposite to said mold receptacles whereby said thermoplastic resin sheet is interposed between said mold receptacles and said mandrels;
(c) disposing a second thermoplastic resin sheet over said mandrels whereby said mandrels are interposed between said first and second sheets;
(d) placing a second molding member over said second sheet whereby said sheets and said mandrels are interposed between said first and second molding members, heating said first and second thermoplastic resin sheets to the melt points thereof to render said sheets deformable and forcing said mold members together to compress said mandrels into said mold receptacles to shape said first sheet to the conforming profiles of said mandrels and said receptacles and to compress said first and second sheets into contact with each other while said sheets are heated to the melt points thereof and thereafter allowing said sheets to cool so that such sheets are laminated together and the portion of said first sheet in said receptacle is shaped conformably to the profiles of said mandrel and said receptacle; and
(e) concomitant with or subsequent to the heating of step (d) disrupting the binder integrity in said mold mandrels to cause said ceramic particulate material to be in a frangible condition and withdrawing said particulate material from between said first and second sheets.

13. The method of claim 12 further comprising the step of placing a third thermoplastic resin sheet in contact with the shaped portions of said first sheet and heating said first and third sheets while compressing said sheets together to cause lamination between said first and third sheets.

14. The method of claim 12 wherein the sides of said elongated mandrels and said elongated mold receptacles are tapered to provide draft angles of at least 5°.

15. The method of claim 12 wherein the integrity of said binder material is disrupted by heating to a temperature sufficient during step (d) to cause said binder material to embrittle.

16. The method of claim 12 wherein said binder material is disrupted in step (e) by contacting said mandrel in situ within said receptacle with a solvent for said binder material.

17. The method of claim 16 wherein said binder material is sodium silicate and said solvent is water.

18. The method of claim 12 wherein said ceramic material has an average particle size of no greater than 0.2 mm.

19. The method of claim 18 wherein said ceramic particulate material has a predominant particle size distribution within the range of 0.1–0.3 mm.

20. In a method for the formation of a reinforced laminate panel structure, the steps comprising:
(a) disposing a first outer sheet formed of a thermoplastic resin on a first molding member;
(b) disposing a first plurality of spaced-apart longitudinally extending mold mandrels formed of particulate ceramic material and a binder functioning for said ceramic material on said thermoplastic resin sheet whereby said thermoplastic resin sheet is interposed between said first molding member and said mandrels;
(c) disposing an intermediate second thermoplastic resin sheet over said first plurality of mandrels whereby said mandrels are interposed between said first outer and intermediate sheets;
(d) placing a second plurality of longitudinally extending mold mandrels formed of particulate ceramic material and a binder for said ceramic material on said intermediate thermoplastic resin sheet at locations opposite spaced intervals between said first plurality of longitudinally extending mold mandrels whereby said intermediate sheet is interposed between said first and second plurality of mandrels;
(e) placing a second outer thermoplastic resin sheet over said second plurality of said longitudinally extending mandrels;
(f) placing a second molding member over said second outer sheet whereby said sheets and said mandrels are interposed between said first and second molding members, heating said thermoplastic resin sheets to the melt points thereof to render said sheets deformable and forcing said mold members together to compress said second plurality of mandrels to shape said intermediate sheet to the conforming profiles of said mandrels and to compress shaped portions of said intermediate sheet into contact with said first and second sheets while said sheets are heated to the melt points thereof and thereafter allowing said sheets to cool so that such sheets are laminated together and said intermediate sheet in said receptacle is shaped conformably to the profiles of said mandrels; and
(g) concomitant with or subsequent to the heating of step (f) disrupting the binder integrity in said mold mandrels to cause said ceramic particulate material to be in a frangible condition and thereafter withdrawing said particulate material from between said first and second sheets.

21. The method of claim 20 wherein the integrity of said binder material is disrupted by heating said mold mandrels to a temperature sufficient during step (f) to cause said binder material to disintegrate.

22. The method of claim 20 wherein at least a portion of said mandrels are heated internally by means of heating elements disposed within said mandrels.

23. The method of claim 1, wherein said binder is compliant under the heating and compressing conditions of step (d) to permit relative movement of the particles of said particulate ceramic material to provide for isostatic compression of said first thermoplastic resin sheet interposed between said mold receptacle and said mandrel.

24. The method of claim 12 wherein said binder is compliant under the heating and compressing conditions of step (d) to permit relative movement of the particles of said particulate ceramic material to provide for isostatic compression of said first thermoplastic resin sheet interposed between said mold receptacles and said mandrels.

25. The method of claim 20, wherein said binder is compliant at the heating and compressing conditions of step (f) to permit relative movement of the particles of said particulate ceramic material to provide for isostatic compression of said intermediate thermoplastic resin sheet interposed between said first and second plurality of mandrels.

* * * * *